(No Model.)  2 Sheets—Sheet 1.
H. P. DENNIS.
GRAIN METER.
No. 520,518. Patented May 29, 1894.
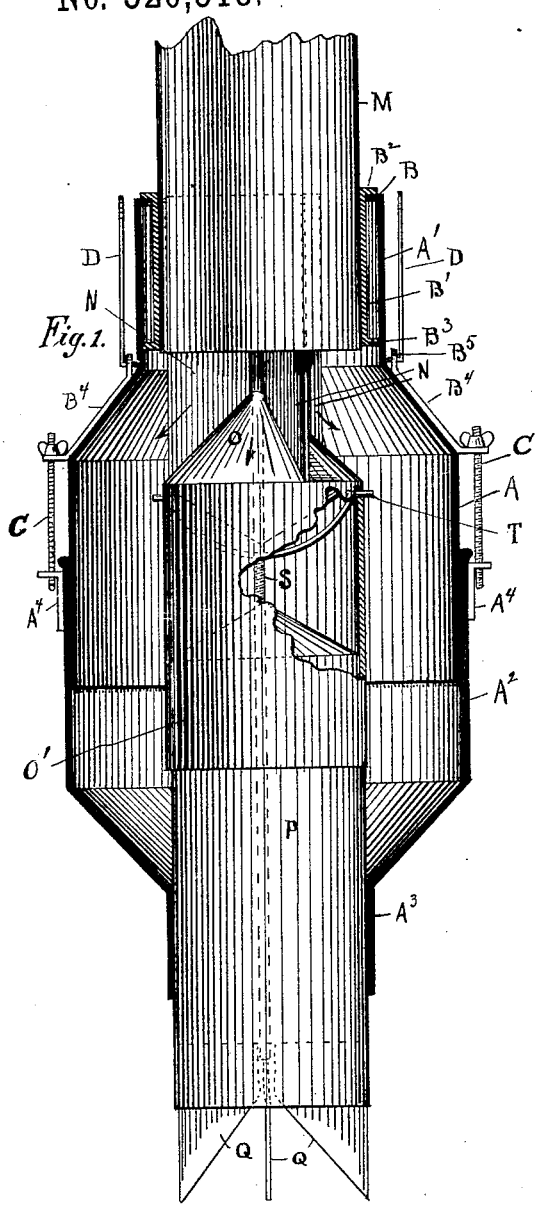
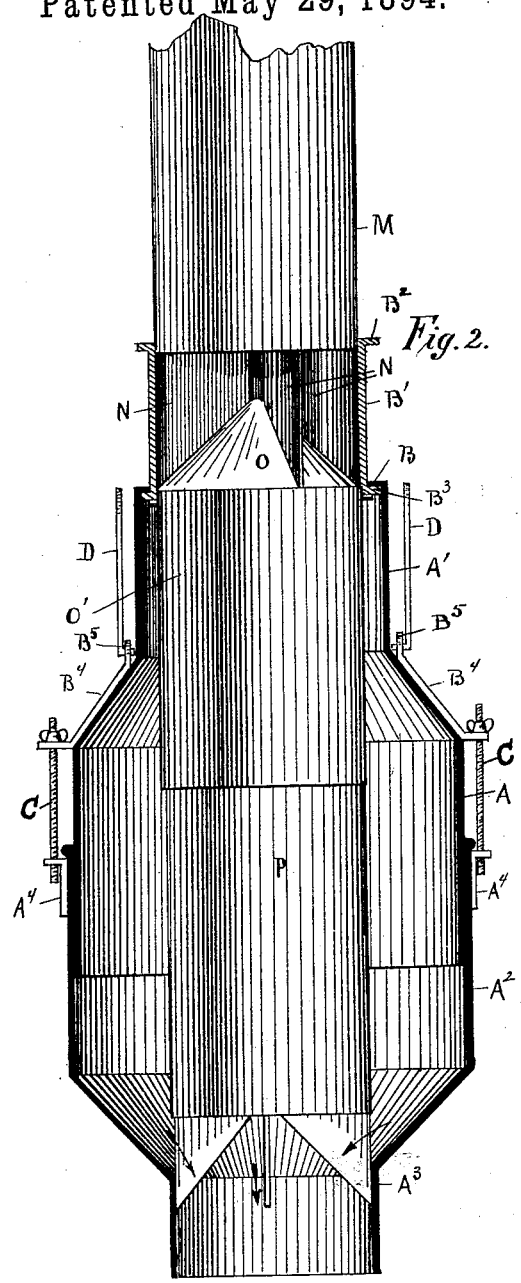
Witnesses
A. Keithley.
J. D. Seltzer.
Inventor
Henry P. Dennis
By L. Mc. Thurlow
Atty.
THE NATIONAL LITHOGRAPHING COMPANY,
WASHINGTON, D. C.

(No Model.)   2 Sheets—Sheet 2.

H. P. DENNIS.
GRAIN METER.

No. 520,518.   Patented May 29, 1894.

Witnesses
A. Keithley
J. D. Seltzer

Inventor
Henry P. Dennis
By L. W. Thurlow
Atty.

UNITED STATES PATENT OFFICE.

HENRY P. DENNIS, OF PEORIA, ILLINOIS, ASSIGNOR OF ONE-HALF TO ALBERTUS D. POTTER, OF SAME PLACE.

GRAIN-METER.

SPECIFICATION forming part of Letters Patent No. 520,518, dated May 29, 1894.

Application filed August 4, 1893. Serial No. 482,413. (No model.)

*To all whom it may concern:*

Be it known that I, HENRY P. DENNIS, a citizen of the United States, residing at Peoria, in the county of Peoria and State of Illinois, have invented certain new and useful Improvements in Grain-Meters; and I do hereby declare the following to be a full, clear, and exact description of the invention, such as will enable others skilled in the art to which it appertains to make and use the same.

This invention relates to improvements in grain meters; and has for its object to provide a device which shall be exceedingly simple, very compact and which will weigh perfectly, which is the chief requirement of a machine of this class.

Figure 3:
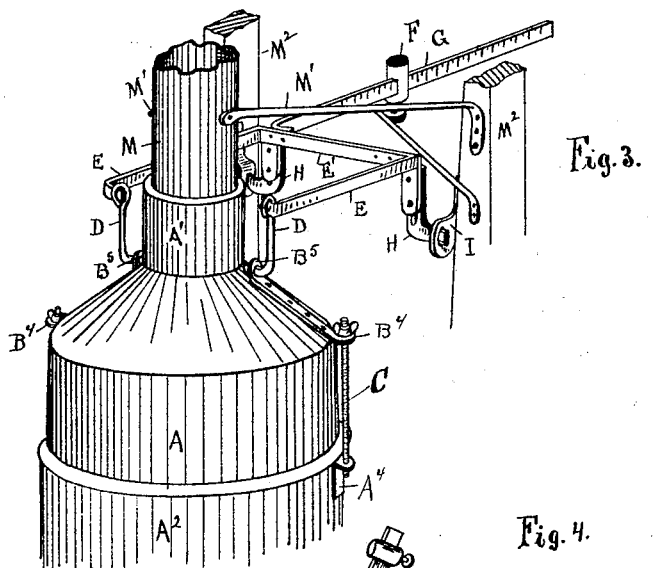
Figure 4:
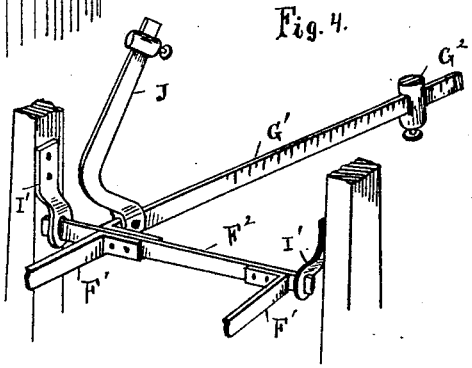

In the drawings presented herewith, Figure 1 represents a sectional elevation of the meter showing same in position to receive grain. Fig. 2 is also a sectional elevation of the meter showing same in position to deliver grain. Fig. 3 is a perspective view of a portion of the meter showing same hung from the weighing apparatus. Fig. 4 is a perspective view of a modified form of weighing attachment with the meter proper detached.

A and $A^2$ represent the telescoping halves of a receptacle or pocket which are usually made round as shown, but which may be made of any shape of cross section desired. The upper extremity of the portion A tapers to a smaller diameter to form the neck A' whose upper end is provided with the inner annular flange B. Within this neck is located a vertically sliding collar B' provided on either end with an outer annular flange $B^2$ and $B^3$ and in operation these flanges form a stop when coming in contact with the flange B of the neck A'. The lower portion $A^2$ of the receptacle is likewise tapered downward to the neck $A^3$. The telescoping portions A and $A^2$ are adjustable by means of two or more thread bars C C passing through threaded straps $B^4$ on the portion A and straps $A^4$ on the portion $A^2$. These thread bars are provided with wing nuts so that the device may be easily adjusted.

Centrally located within the receptacle is a perpendicular conducting tube M which is usually fixed at its upper extremity to a portion of the rigid frame work of the machine standard as shown in Fig. 3 in which M represents the said conductor and M' represents two rods having one of their ends riveted to the said conductor and having the opposite ends bolted to the frame $M^2$.

The pipe M when delivering grain is in the position shown in Fig. 1. To the lower end of said pipe M is secured a tubular valve composed of the parts O' and P which extend downward through the receptacle to the lower neck $A^3$. The said tubular valve O' and P just described is hung from the inlet or conducting pipe M by three or more feathers N which run up into the pipe M far enough to get a firm hold by soldering or otherwise and the lower ends of said feathers N are suitably secured to a cone O located on the top of valve O' which forms a throw off for the grain. It will be seen that the pipe M has its outlet between these feathers N to supply the meter. This is one form of outlet which may be used with the device there being others which are just as good. The tube P enters the portion O' at the lower end thereof and is adjustable therein by the use of a threaded rod S the upper end of which is secured in the center of the cone portion O and the lower end screwing into the said tube portion P similar to the manner shown. By this means the length of the center tube parts may be lengthened or shortened at will. The tube M fits snugly within the sliding collar B' having sufficient play therein to allow the parts to slide smoothly. The lower extremity of the tube P is provided with three or more feathers Q similar to the upper ones N of the pipe M between which the grain runs when delivering from the grain receptacle as shown by darts in Fig. 2. The upper extremities of the straps $B^4$ secured to the tapering portions of the grain receptacle are provided with eyes $B^5$ into each of which is inserted the end of a hanger rod D which are in turn provided with eyes on their upper ends and are hung on the hooked ends of the arms E as shown. These arms E are made with or bolted to a rod E' which forms a connecting rod between the rear ends of said arms E and a scale beam G is secured to said rod E' said scale beam occupying a position parallel to the arms E E and is provided with an adjustable weight F. At the juncture of the rear ends of each of the arms E and the rod E' is adjustably secured a depending balance arm H resting in the eyes of a strap I secured to the frame work of the machine.

In the modified form of the weighing portion shown in Fig. 4, the arms F' F' are secured to the rocking arm F² which is hung in the eyes I' and the scale beam G' carries the usual weight G². Pivoted to the upper edge of the said beam G' is a weighted arm J whose pivoted end is placed as close to the rocking arm F² as possible. From its pivoted point the said arm J is bent upward at an angle of about forty five degrees to overhang the rocker arm and is then bent at right angles to form the longer portion of the arm which carries the weight. This weight is located directly above the rocker arm F².

The operation of the device is as follows: The pipe M being rigidly hung from a rigid frame M² and receiving the grain, or other matter to be weighed, from the elevator head or other source of supply must of necessity in this case be stationary. Therefore the receptacle for the grain is hung from the weighing attachment. By means of the adjustable weight on the scale beam the receptacle is adjusted to weigh any number of pounds as desired. Grain being now admitted to the pipe M sets up a flow to the bottom of the receptacle through the openings between the feathers N when in the position shown in Fig. 1 by darts. When the receptacle has received a weight of grain sufficient to tip the scale beam it drops instantly. When dropping, the sliding collar B' falls with the receptacle but is arrested after its lower extremity has reached a point just below the outlet from pipe M, where it strikes a stop consisting of a length of spring wire T which is bent in a semi-circular form and is placed within the tube O' the ends of which protrude through diametrically opposite sides of the said tube. The collar on striking this stop is arrested in its fall and is there sustained while the receptacle continues to fall until the flange B of the neck A' rests upon the flange B³ as shown in Fig. 2. By this means the said sliding collar B' closes the grain outlet and thus arrests the supply of grain while the lower end of the receptacle has dropped below the end of the tube portion P thus allowing the grain to drop out between the feathers Q. The weight having passed from the receptacle, the weight of the scale beam overcomes the weight of said receptacle and the device assumes its normal position or first position. The scale pivots shown in Fig. 3 being placed below the weigher arms allows the device to drop instantly as before stated after the weight passes over center and by this construction the receptacle is held down until all grain has passed out after which the device assumes its first position.

The form of weighing device shown in Fig. 4 operates as follows: When the grain has weighted the receptacle sufficiently to overcome the weight of the scale beam G', the receptacle begins to fall and in so doing the weight of the beam J immediately passes over center and the device is held down by the weight thus thrown upon it. When the grain has passed out of the receptacle, the weighted scale beam G' starts downward and the best use of the weighted arm J is now apparent; the said arm J in this position does not quite counter-balance the scale beam G' and thus the device is slowly brought to its first position without jar and the device is ready for a second charge. It must of course be understood that there is sufficient play between the arm J and the scale beam to allow said arm to swing easily.

What I claim as new, and desire to secure by Letters Patent, is—

1. In a grain meter a vertical receptacle composed of the telescoping halves A and A² adjusted by the thread bars C C, and the straps B⁴ and A⁴ secured to the said portions A and A² respectively, the upper extremity of said portion A being contracted to form the neck A', having an annular flange B, a sliding collar B' located within the said neck and provided at either end with an outer annular flange adapted to engage with said flange B, the lower extremity of said receptacle being contracted to form the neck A³, in combination with a vertical centrally located supply pipe M adapted to deliver grain at the upper extremity of the receptacle, the part O' being surmounted by a cone O and hung from the said pipe M by suitable means, the upper extremity of said portion O' being provided also with a stop T for the sliding collar B', the tubular portion P telescoping the said portion O' and capable of adjustment for length by suitable means and all working together substantially in the manner and for the purposes herein set forth and described.

2. In a grain meter, a grain receptacle comprising the telescoping halves A and A² in combination with a weighing device consisting of the parallel arms E E connected at their rear ends with the rod E', the forward ends of the said rods E pivotally supporting the said receptacle by means of the pivoted hangers D, the depending arms H adjustably secured to the said rod E' having their lower ends pivotally hung in the eyes I secured to the frame of the machine and the scale beam G attached to the said rod E' substantially in the manner and for the purposes set forth and described.

3. In a grain meter, a vertical movable grain receptacle capable of being lengthened, in combination with a vertical inlet pipe and parts O' and P centrally located within said receptacle, said parts O' and P being adjustable for length substantially as and for the purposes specified.

4. In a grain meter, a vertical movable grain receptacle, capable of being lengthened by means of the thread bars C C engaging with the straps B⁴ and A⁴ secured to said receptacle in combination with a vertical fixed inlet pipe, located within said receptacle, the parts O' and P passing entirely through said receptacle, said parts O' and P being attached to the said pipe M and forming the guide for said receptacle in its movement in the manner and for the purposes herein set forth and described.

5. In a grain meter, a vertical grain receptacle adjustable for length and adapted to have a vertical movement substantially in the manner and for the purposes set forth, in combination with a vertical centrally located fixed supply or inlet pipe, the parts O' and P passing entirely through said receptacle and attached to the said inlet pipe, the pipe composed of the part O' and the telescoping part P being adjustable for length by the threaded rod S, the feathers N securing the top of said part O' to the pipe M, and the feathers Q located in the lower end of the part P substantially in the manner and for the purposes herein set forth and described.

6. In a grain receptacle provided at its upper and lower extremities with necks A' and A³ respectively, said upper neck inclosing a sliding sleeve B', the travel of said sleeve being limited by the flange B on said upper neck A' said lower neck closely surrounding a part P, the body of the receptacle enlarging at the middle of its length for the purposes set forth and described.

7. In a grain meter, a supply pipe M, the part O' having the vertical feathers or walls N mounted thereon, said part being surmounted by the pipe M, a spring stop T secured near the top of the part O' substantially in the manner and for the purposes set forth, in combination with a pipe P entering said portion O' from below and having a series of vertical feathers or walls Q secured in the lower end thereof, and a threaded bar S all constructed substantially in the manner and for the purposes set forth.

In testimony whereof I affix my signature in presence of two witnesses.

HENRY P. DENNIS.

Witnesses:
JOHN D. SELTZER,
ARTHUR KEITHLEY.